United States Patent
Branson et al.

(10) Patent No.: US 9,665,401 B2
(45) Date of Patent: *May 30, 2017

(54) DYNAMIC RUN TIME ALLOCATION OF DISTRIBUTED JOBS

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 652 days.

This patent is subject to a terminal disclaimer.

(21) Appl. No.: 13/755,146

(22) Filed: Jan. 31, 2013

(65) Prior Publication Data

US 2013/0139174 A1 May 30, 2013

Related U.S. Application Data

(63) Continuation of application No. 12/821,784, filed on Jun. 23, 2010, now abandoned.

(51) Int. Cl.
*G06F 9/50* (2006.01)

(52) U.S. Cl.
CPC ............ *G06F 9/505* (2013.01); *G06F 9/5066* (2013.01); *G06F 9/5083* (2013.01)

(58) Field of Classification Search
None
See application file for complete search history.

(56) References Cited

U.S. PATENT DOCUMENTS

| 7,386,586 B1 | 6/2008 | Headley et al. |
| 8,566,837 B2 | 10/2013 | Branson et al. |

(Continued)

OTHER PUBLICATIONS

Pending U.S. Patent Application entitled "Dynamic Run Time Allocation of Distributed Jobs With Application Specific Metrics", U.S. Appl. No. 12/837,568, filed Jul. 16, 2010 by Michael J. Branson et al.

(Continued)

*Primary Examiner* — Tuan Dao
(74) *Attorney, Agent, or Firm* — Martin & Associates, LLC; Bret J. Petersen

(57) ABSTRACT

A job optimizer dynamically changes the allocation of processing units on a multi-nodal computer system. A distributed application is organized as a set of connected processing units. The arrangement of the processing units is dynamically changed at run time to optimize system resources and interprocess communication. A collector collects metrics of the system, nodes, application, jobs and processing units that will be used to determine how to best allocate the jobs on the system. A job optimizer analyzes the collected metrics to dynamically arrange the processing units within the jobs. The job optimizer may determine to combine multiple processing units into a job on a single node when there is an overutilization of interprocess communication between processing units. Alternatively, the job optimizer may determine to split a job's processing units into multiple jobs on different nodes where the processing units are over utilizing the resources on the node.

1 Claim, 6 Drawing Sheets

(56) References Cited

U.S. PATENT DOCUMENTS

| | | | |
|---|---|---|---|
| 2006/0107087 A1* | 5/2006 | Sieroka | G06F 9/4856 |
| | | | 714/4.1 |
| 2006/0167984 A1* | 7/2006 | Fellenstein | G06F 9/5072 |
| | | | 709/203 |
| 2008/0104605 A1 | 5/2008 | Steinder et al. | |
| 2008/0216087 A1 | 9/2008 | Dillenberger et al. | |
| 2009/0048998 A1 | 2/2009 | Kaminsky et al. | |
| 2009/0083390 A1* | 3/2009 | Abu-Ghazaleh et al. | 709/209 |
| 2009/0150898 A1 | 6/2009 | Sohn et al. | |
| 2009/0158276 A1* | 6/2009 | Barsness et al. | 718/100 |
| 2009/0313636 A1* | 12/2009 | Barsness et al. | 718/105 |
| 2010/0011254 A1* | 1/2010 | Votta et al. | 714/47 |
| 2010/0043009 A1 | 2/2010 | Marchand | |
| 2010/0125477 A1 | 5/2010 | Mousseau et al. | |
| 2010/0131959 A1 | 5/2010 | Spiers et al. | |
| 2012/0278477 A1* | 11/2012 | Terrell | H04L 41/5009 |
| | | | 709/224 |

OTHER PUBLICATIONS

Pending U.S. Patent Application entitled "Dynamic Run Time Allocation of Distributed Jobs With Application Specific Metrics", U.S. Appl. No. 13/709,222, filed Dec. 10, 2012 by Michael J. Branson et al.

U.S. Appl. No. 12/821,784 entitled "Dynamic Run Time Allocation of Distributed Jobs" filed Jun. 23, 2010 by Michael J. Branson et al.

U.S. Appl. No. 13/900,948 entitled "Dynamic Run Time Allocation of Distributed Jobs With Application Specific Metrics" filed May 23, 2013 by Michael J. Branson et al.

\* cited by examiner

DYNAMIC RUN TIME ALLOCATION OF DISTRIBUTED JOBS

BACKGROUND OF THE INVENTION

1. Technical Field

This disclosure generally relates to parallel computing systems, and more specifically relates to dynamically allocating a job or a processing unit (part of a job) on a multi-nodal, parallel computer system.

2. Background Art

Large, multi-nodal computer systems (e.g. grids, supercomputers, commercial clusters, etc.) continue to be developed to tackle sophisticated computing jobs. One such multi-nodal parallel computer being developed by International Business Machines Corporation (IBM) is the Blue Gene system. The Blue Gene system is a scalable system with 65,536 or more compute nodes. Each node consists of a single ASIC (application specific integrated circuit) and memory. Each node typically has 512 megabytes of local memory. The full computer is housed in 64 racks or cabinets with 32 node boards in each. Each node board has 32 processors and the associated memory for each processor. As used herein, a massively parallel computer system is a system with more than about 10,000 processor nodes.

These new systems are dramatically changing the way programs and businesses are run. Because of the large amounts of data needing to be processed, current systems simply cannot keep up with the workload. The computer industry is more and more using distributed capacity or distributed computing. An application or sometimes a part of an application is often referred to as a "job". In distributed computing, a job may be broken up into separate run time units (referred herein as processing units) and executed on different nodes of the system. The processing units are assigned to a node in the distributed system by a job scheduler or job optimizer.

DISCLOSURE OF INVENTION

A method and apparatus is described for a job optimizer that dynamically changes the allocation of processing units on a multi-nodal computer system. A distributed application is organized as a set of connected processing units. The arrangement of the processing units is dynamically changed at run time to optimize system resources and interprocess communication. A collector collects metrics of the system, nodes, application, jobs and processing units that will be used to determine how to best allocate the jobs on the system. A job optimizer analyzes the collected metrics and determines how to dynamically arrange the processing units within the jobs. The job optimizer may determine to combine multiple processing units into a job on a single node when there is an overutilization of a interprocess communication between processing units. Alternatively, the job optimizer may determine to split a job's processing units into multiple jobs on different nodes where one or more of the processing units are over utilizing the resources on the node. In addition, the job optimizer may determine to split a job's processing units into multiple jobs on the same node, in order to better utilize a node with multiple processors.

The disclosed embodiments are directed to the Blue Gene architecture but can be implemented on any cluster with a high speed interconnect that can perform broadcast communication. The foregoing and other features and advantages will be apparent from the following more particular description, as illustrated in the accompanying drawings.

BRIEF DESCRIPTION OF DRAWINGS

The disclosure will hereinafter be described in conjunction with the appended drawings, where like designations denote like elements, and.

BEST MODE FOR CARRYING OUT THE INVENTION

Figure 1:
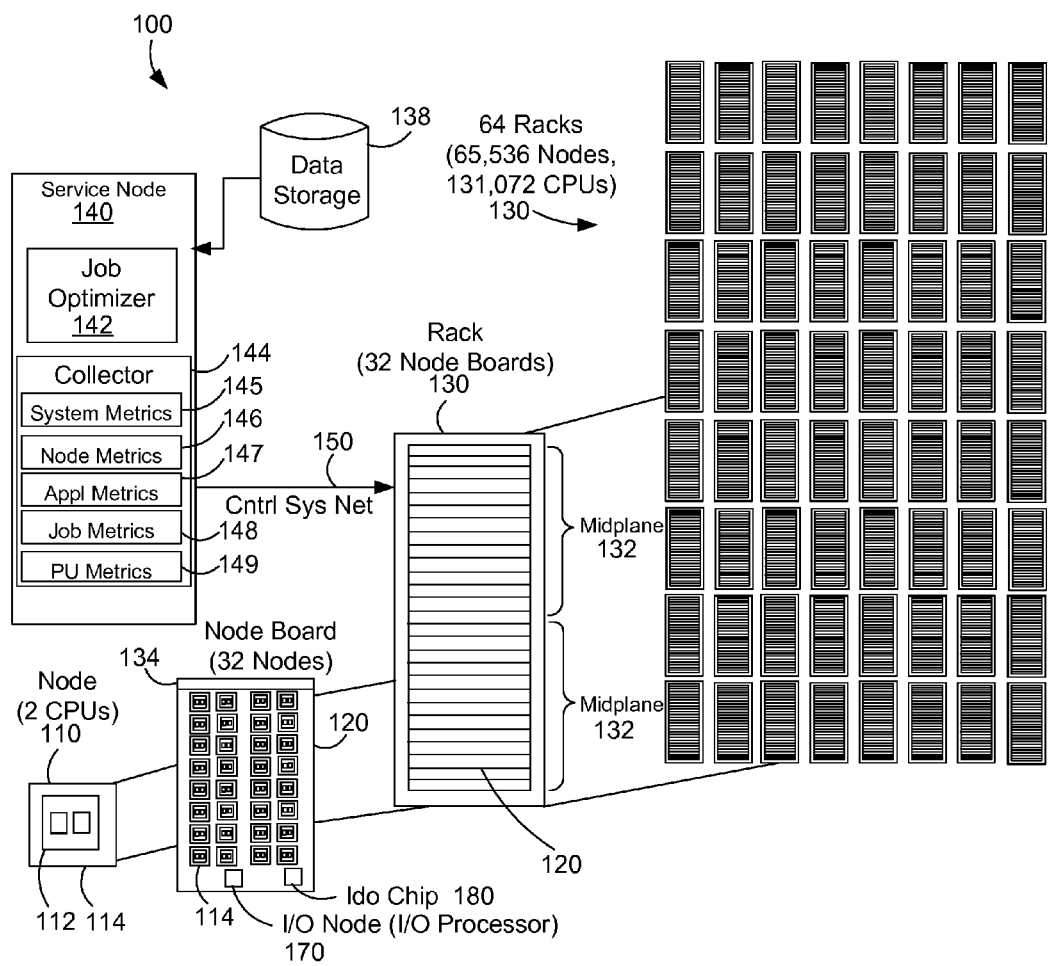
FIG. 1 is a block diagram of a computer system as claimed herein.

In this disclosure, a method and apparatus is described for a job optimizer that dynamically changes the allocation of processing units (PU) on a multi-nodal computer system. A distributed application is organized as a set of connected processing units. The arrangement of the processing units is dynamically changed at run time to optimize system resources and interprocess communication. A collector collects metrics of the system, nodes, application, jobs and processing units that will be used to determine how to best allocate the jobs on the system. A job optimizer analyzes the collected metrics and determines how to dynamically arrange the processing units within the jobs. The job optimizer may determine to combine multiple processing units into a job on a single node when there is an overutilization of a interprocess communication between processing units. Alternatively, the job optimizer may determine to split a job's processing units into multiple jobs on different nodes where one or more of the processing units are over utilizing the resources on the node. In addition, the job optimizer may determine to split a job's processing units into multiple jobs on the same node, in order to better utilize a node with multiple processors.

In a distributed environment, message passing and shared memory become standard mechanisms to address how information is passed back and forth between processes or processing units. When writing distributed applications, developers typically need to design up-front how information is passed between its distributed parts. Likewise, some distributed systems are set up such that at deploy time the end user can pick how processes will communicate. When applications are distributed in a multi nodal environment, trade-offs are typically made to determine where segments of the application, i.e. "jobs" should be broken into separate processing units (sometimes referred to as run time units) or kept together in one job such that they can communicate more efficiently with each other. One drawback of processing units in separate jobs, is that it increases IPC (Inter process communications) on mechanisms for communication such as shared memory or information protocol sockets (IP) which has a negative impact on performance. Alternatively, where these processing units are kept together in one job they can use some sort of synchronization method of passing or accessing data amongst a plurality of threads. While the environment dictates the optimal tradeoff between these, it's really not possible to know exactly what the environment will be like at run time as things change and evolve as data gets processed. The job optimizer as described herein can dynamically reorganize the processing units based on a changing environment as discovered by collecting metrics for the various parts of the system.

The dynamic allocation of processing units as described herein is facilitated by a software system that provides an environment for distributed computing with local/remote transparency to the application developer. This "software system" could be part of an operating system, or it could be a layer of software running on an operating system. The software system typically will utilize more efficient communication mechanisms in the local case than in the remote cases. The application code is written in a manner that is indifferent as to whether a PU is communicating (i.e. exchanging data) with another PU via an intra-process mechanism (i.e. stack, heap, etc.), an inter-process mechanism (e.g. TCP/IP socket) or an inter-node mechanism (e.g. TCP/IP socket running over a network connection). When the arrangement of PUs is changed to better optimize the application, the underlying support for local/remote transparency allows the application to continue to function without the need to change its application code.

Dynamic relocation could be beneficial where a communications wire or network is simply bogged down and we need to communicate in a different way. Or there may be a circumstance when shared memory resources become tight and it's more important to spend time over a communication wire than to use shared memory. Or furthermore we determine that the heap size of a given job is starting to cause problems and therefore splitting out the work and relying upon IPC is the correct choice of action. To facilitate the dynamic relocation, there are metrics for each possible communications mechanism used by the processing units. These simple metrics are used to track how much a given resource is being used and how much more taxing adding more work can be to the given situation for that resource.

FIG. 1 shows a block diagram that represents a massively parallel computer system 100 such as the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards×32 nodes×2 CPUs).

The Blue Gene/L computer system structure can be described as a compute node core with an I/O node surface, where communication to 1024 compute nodes 110 is handled by each I/O node 170 that has an I/O processor connected to the service node 140. The I/O nodes 170 have no local storage. The I/O nodes are connected to the compute nodes through the logical tree network and also have functional wide area network capabilities through a gigabit Ethernet network (See FIG. 2 below). The gigabit Ethernet network is connected to an I/O processor (or Blue Gene/L link chip) in the I/O node 170 located on a node board 120 that handles communication from the service node 160 to a number of nodes. The Blue Gene/L system has one or more I/O nodes 170 connected to the node board 120. The I/O processors can be configured to communicate with 8, 32 or 64 nodes. The service node uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below. In the Blue Gene/L system there may also be a number of front end nodes that are similar to the service node 140. As used herein, the term service node includes these other front end nodes.

The service node 140 communicates through the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node.

The service node includes a job optimizer 142 that allocates parts of applications called jobs to execute on one or more of the compute nodes. As illustrated in FIG. 1, the job optimizer is software executing on the service node 140. Alternatively, the job optimizer 142 may also reside on a front end node or on another node of the system. The job optimizer may be stored in data storage 138 or may be stored on a disk (not shown) for distribution or sale. In conjunction with the job optimizer 142, the service node 140 also has a collector 144 that includes various metrics used by the collector. The metrics described herein include system metrics 145, node metrics 146, application metrics 147, job metrics 148 and processing unit (PU) metrics 149.

Figure 2:
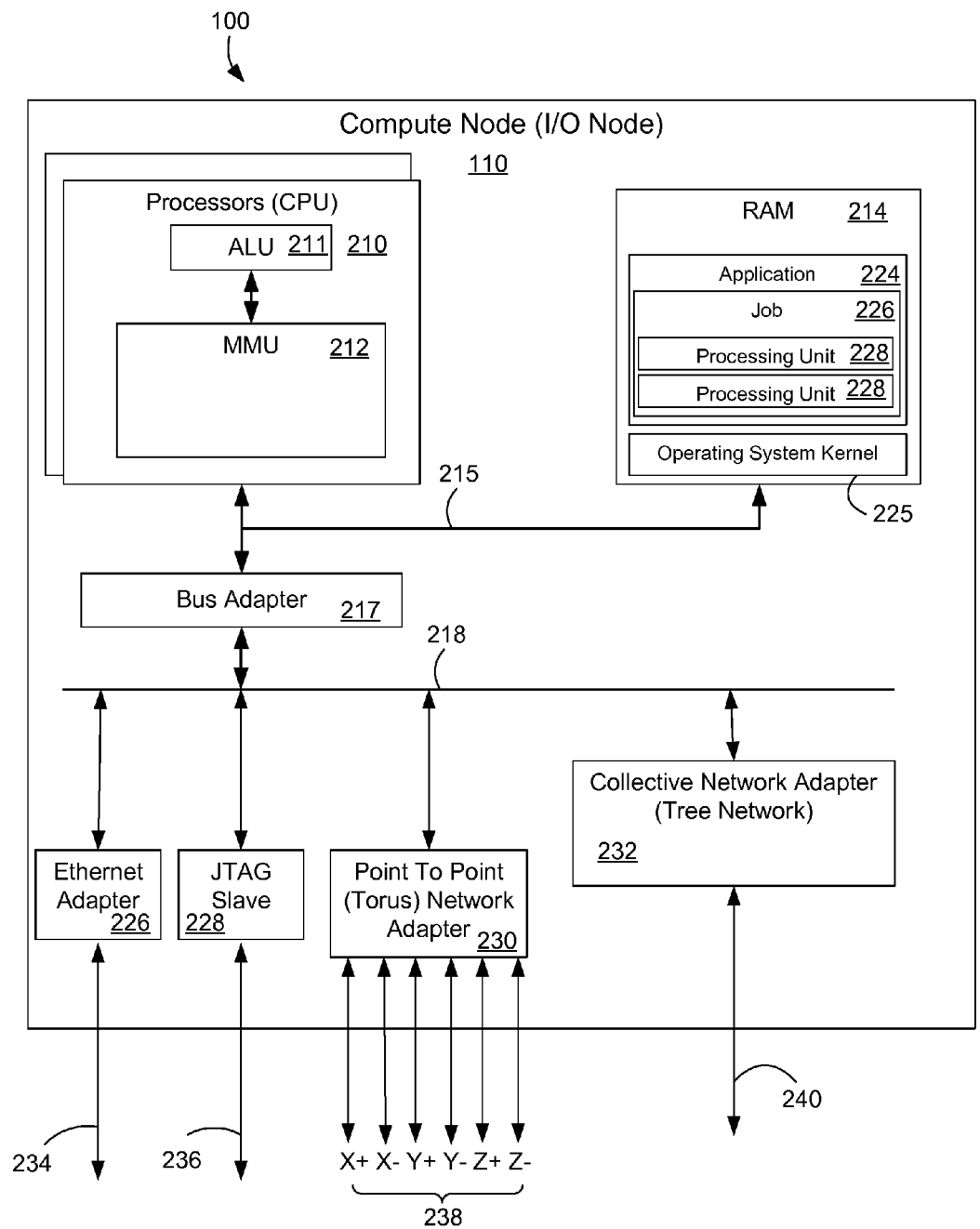
FIG. 2 is a block diagram of a single node of a massively parallel computer system as claimed herein.

FIG. 2 illustrates a block diagram of an exemplary compute node as introduced above. FIG. 2 also represents a block diagram for an I/O node, which has the same overall structure as the compute node. A notable difference between the compute node and the I/O nodes is that the Ethernet adapter 226 is connected to the control system on the I/O node but is not used in the compute node. The compute node 110 of FIG. 2 includes a plurality of computer processors 210, each with an arithmetic logic unit (ALU) 211 and a memory management unit (MMU) 212. The processors 210 are connected to random access memory ('RAM') 214 through a high-speed memory bus 215. Also connected to the high-speed memory bus 214 is a bus adapter 217. The bus adapter 217 connects to an extension bus 218 that connects to other components of the compute node.

Stored in RAM 214 is a an application program 224, and an operating system kernel 225. The application program is loaded on the node by the control system to perform a user designated task. The application program typically runs in parallel with application programs running on adjacent nodes. The application 224 may be divided into one or more job(s) 226 which may be further divided into one or more processing units 228. The operating system kernel 225 is a module of computer program instructions and routines for an application program's access to other resources of the compute node. The quantity and complexity of tasks to be performed by an operating system on a compute node in a massively parallel computer are typically smaller and less complex than those of an operating system on a typical stand alone computer. The operating system may therefore be quite lightweight by comparison with operating systems of general purpose computers, a pared down version as it were, or an operating system developed specifically for operations on a particular massively parallel computer. Operating systems that may usefully be improved, simplified, for use in a compute node include UNIX, Linux, Microsoft XP, AIX, IBM's i5/OS, and others as will occur to those of skill in the art.

The compute node 110 of FIG. 2 includes several communications adapters 226, 228, 230, 232 for implementing data communications with other nodes of a massively parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network.

The data communications adapters in the example of FIG. 2 include a Gigabit Ethernet adapter 226 that couples example I/O node 110 for data communications to a Gigabit Ethernet 234. In Blue Gene, this communication link is only used on I/O nodes and is not connected on the compute nodes. Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit 228 that couples the compute node 110 for data communications to a JTAG Master circuit over a JTAG network 236. JTAG is the usual name used for the IEEE 1149.1 standard entitled Standard Test Access Port and Boundary-Scan Architecture for test access ports used for testing printed circuit boards using boundary scan. JTAG boundary scans through JTAG Slave 236 may efficiently configure processor registers and memory in compute node 110.

The data communications adapters in the example of FIG. 2 include a Point To Point Network Adapter 230 that couples the compute node 110 for data communications to a network 238. In Blue Gene, the Point To Point Network is typically configured as a three-dimensional torus or mesh. Point To Point Adapter 230 provides data communications in six directions on three communications axes, x, y, and z, through six bidirectional links 238: +x, −x, +y, −y, +z, and −z. The torus network logically connects the compute nodes in a lattice like structure that allows each compute node 110 to communicate with its closest 6 neighbors.

The data communications adapters in the example of FIG. 2 include a collective network or tree network adapter 232 that couples the compute node 110 for data communications to a network 240 configured as a binary tree. This network is also sometimes referred to as the collective network. Collective network adapter 232 provides data communications through three bidirectional links: two links to children nodes and one link to a parent node (not shown). The collective network adapter 232 of each node has additional hardware to support operations on the collective network.

Again referring to FIG. 2, the collective network 240 extends over the compute nodes of the entire Blue Gene machine, allowing data to be sent from any node to all others (broadcast), or a subset of nodes. Each node typically has three links, with one or two links to a child node and a third connected to a parent node. Arithmetic and logical hardware is built into the collective network to support integer reduction operations including min, max, sum, bitwise logical OR, bitwise logical AND, and bitwise logical XOR. The collective network is also used for global broadcast of data, rather than transmitting it around in rings on the torus network. For one-to-all communications, this is a tremendous improvement from a software point of view over the nearest-neighbor 3D torus network.

Figure 3:
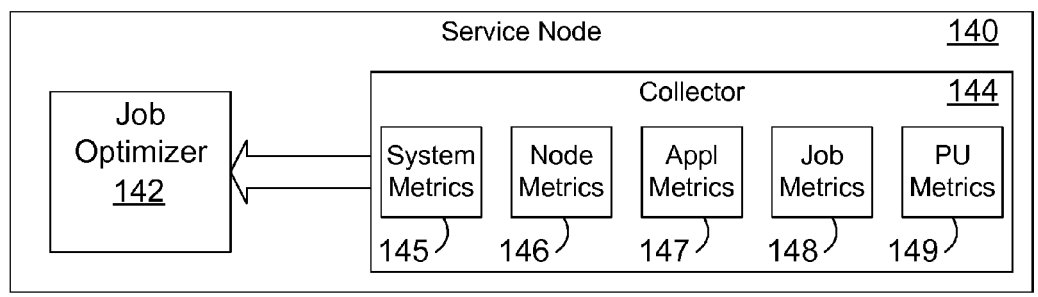
FIG. 3 is a block diagram that illustrates the interaction of the software elements described herein.

FIG. 3 shows a block diagram that illustrates the interaction of the software elements shown to reside in the service node 140 of FIG. 1 and the compute node 110 in FIG. 2. The collector 144 in the service node 140 collects metrics of the system and software. The metrics include system metrics 145, node metrics 146, application metrics 147, job metrics 148 and processing unit (PU) metrics 149. The collector passes these metrics to the job optimizer 142. Portions (not shown) of the collector 144 may also reside in the RAM 214 (FIG. 2) of nodes to collect the metrics.

Figure 4:
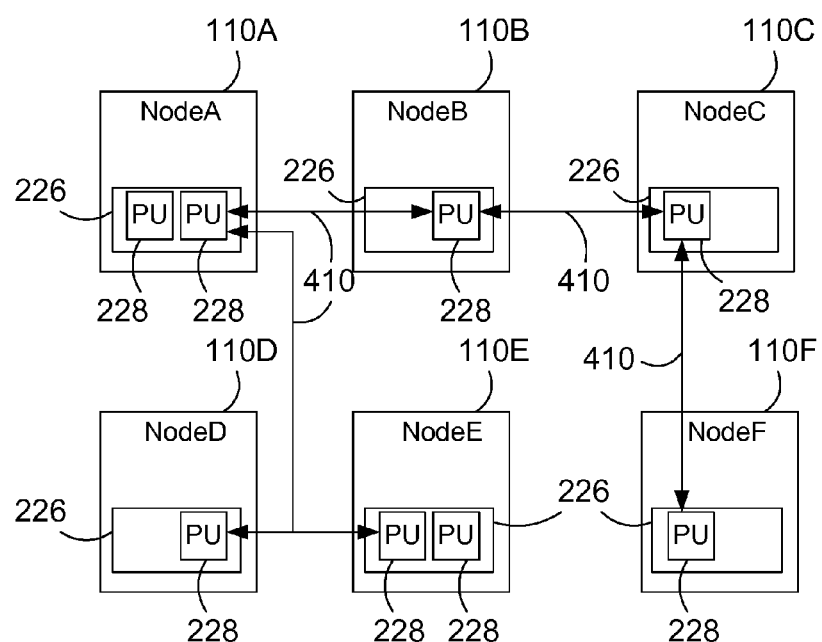
FIG. 4 is a block diagram representing a portion of the computer system 100 shown in FIG. 1.

The collector 144 collects metrics that are used by the job optimizer to dynamically allocate jobs or parts of a jobs (processing units) on a multi-nodal, parallel computer system. Examples of metrics include the following:

1) System Metrics:
Aggregate CPU utilization across the multi-nodal system
Aggregate Memory utilization across the multi-nodal system
Aggregate network load across the multi-nodal system
Node-to-node network utilization
2) Node Metrics:
CPU utilization for a node
Memory utilization for a node
Heap size for a node
3) Application metrics:
Aggregate CPU utilization by an application
Aggregate memory utilization by an application
Result throughput for the application
Result latency for the application
4) Job metrics
Aggregate CPU utilization for the job
Aggregate memory utilization for the job Data throughput utilization for the job
Data latency for the job
5) Processing Unit (PU) metrics
CPU utilization of the PU
Memory utilization of the PU
Data throughput of the PU
Data latency for the PU FIG. 4 is a block diagram representing a portion of the computer system 100 shown in FIG. 1. Each node 110A-110F has a job 226 containing one or more processing units 228. The job 226 on the nodes 110A-110F may collectively make up a single application or the jobs 226 may be portions of different applications. This diagram represents the interaction of data communication between processing units in the system. The lines 410 between the processing units 228 represent data communication or data sharing between the processing units. Processing units 228 within the same job 226 on the same node may also be communicating but no line is shown.

Figure 5:
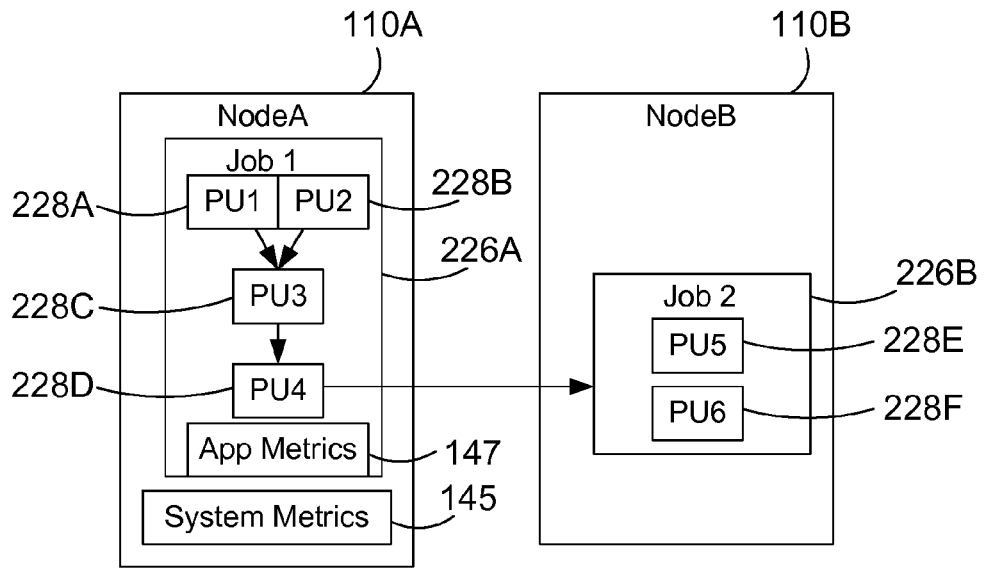
FIG. 5 is a block diagram representing two nodes of a computer system as represented in FIG. 1 to illustrate an example of dynamically dividing an application or job as described and claimed herein.

FIG. 5 is a block diagram representing two nodes, NodeA 110A and NodeB 110B, of a computer system similar to computer system 100 shown in FIG. 1. FIG. 5 illustrates an example of dynamically dividing an application or job as described and claimed herein. Running on NodeA 110A is Job1 226A that is composed of four processing units (PU1 228A, PU2 228B, PU3 228C and PU4 228D). Running on NodeB 110B is Job2 226B that is composed of two processing units (PU5 228E and PU6 228F). For this example, Job1 and Job 2 combined comprise an application 224. PU1 228A and PU2 228B process data from one or more inputs sources (not shown). PU3 takes data from PU1 and PU2 and reduces and/or summarizes the data. PU4 228D takes data from PU3 and performs some complex statistical analysis using the data. PU4 then publishes its results to Job2 228B running on NodeB 110B.

Figure 6:
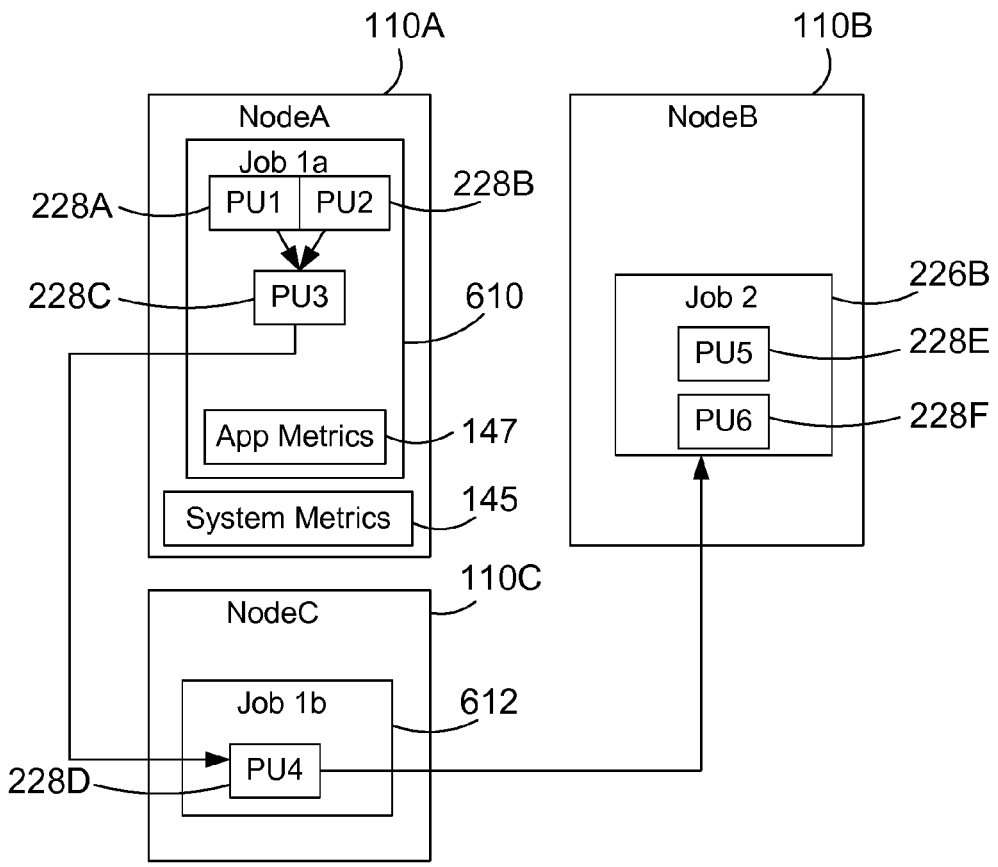
FIG. 6 is a block diagram similar to FIG. 5 to illustrate an example of dynamically dividing an application or job as described and claimed herein.

An example of dynamically changing the distribution of processing units will now be described with reference to FIG. 5 and FIG. 6. The Job Optimizer 142 (FIG. 1) examines the Application Metrics 147 and determines that recently Job1 226A is not providing results to Job2 226B fast enough. It also examines the System Metrics 145 on NodeA and sees that NodeA has been running at a very high level of CPU utilization. The Job Optimizer then looks at the PU Metrics for PU1, PU2, PU3, and PU4 (not shown in FIG. 5). The Job optimizer 142 determines from the collector 144 that PU1, PU2 and PU3 combined are using about 40% of the CPU and that PU4 is using 60% of the CPU. The Job Optimizer 142 determines to split Job1 into two jobs. These two jobs are shown as Job1a 610 and Job1b 612 in FIG. 6. The communications between PU3 and PU4 is an inter process communication that is currently local, but can also be handled over a communication link. This change in communication is preferably handled by the operating system in a way that is invisible to the processing unit as discussed above. PU4 228D is moved into Job1b 612 and placed on NodeC 110C as shown in FIG. 6. Job1a 610 will now consist of PE1, PE2 and PE3 and run on NodeA. Job1b will consist of PU4 and run on NodeC. The result is that more CPU resources are available to PU4 and it should be able to provide results faster to Job2 226B. Note the Application metrics 147, System Metrics 145 and the PU Metrics may reside within NodeA or on the service node 140 in FIG. 1. Similarly, these elements and portions of the Job Optimizer 140 may also reside on the RAM 214 associated with the nodes as shown in FIG. 2.

Figure 7:
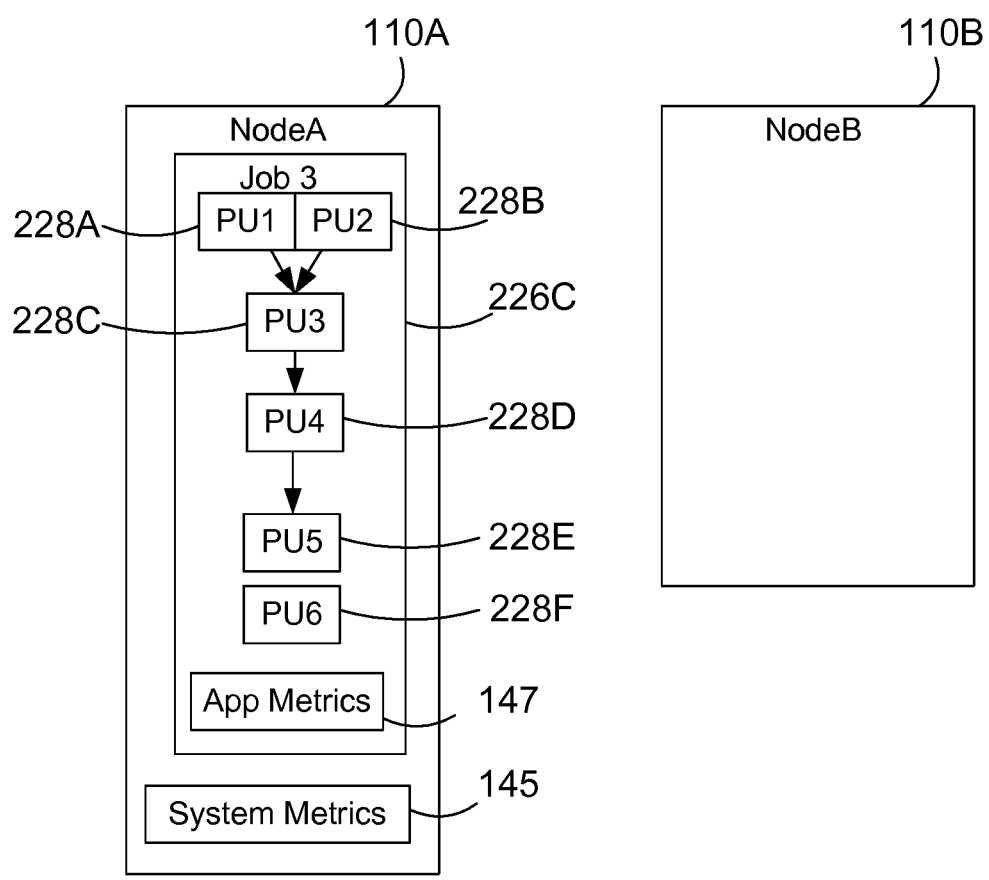
FIG. 7 is a block diagram similar to FIG. 5 to illustrate an example of dynamically combining an application or job as described and claimed herein.

FIG. 7 is a block diagram to illustrate an example of dynamically combining a job as described and claimed herein. The initial scenario for this example is as shown and described above with reference to FIG. 5. The Job Optimizer 142 (FIG. 1) examines the Application Metrics 147 and determines that the application 224 is running well. It also examines the System Metrics for NodeA and NodeB and determines that neither is running at a high-level of utilization. It also examines the system metrics 145 and sees that the level of network traffic is very high. It determines to combine Job1 with Job2 into a job called Job3 226C and to run Job3 on NodeA 110A as shown in FIG. 7. Job3 226C running on NodeA will consist of 6 PUs. The overall level of network traffic will be reduced because the interprocess communication between Job1 and Job2 no longer needs to occur, because their jobs have been combined onto a single node.

The previous two examples described splitting a job running on one node into two jobs that run on two nodes combining and combining PUs into a job that runs on a single node. Similarly, a job running on one node can be split into two jobs that run on one node where there may be a performance benefit to do this in some cases. For example, on nodes with multiple processors, breaking things up into multiple jobs may allow for better exploitation of the multiple processors. This would be done in a manner similar to described above but not shown in the Figures.

Figure 8:
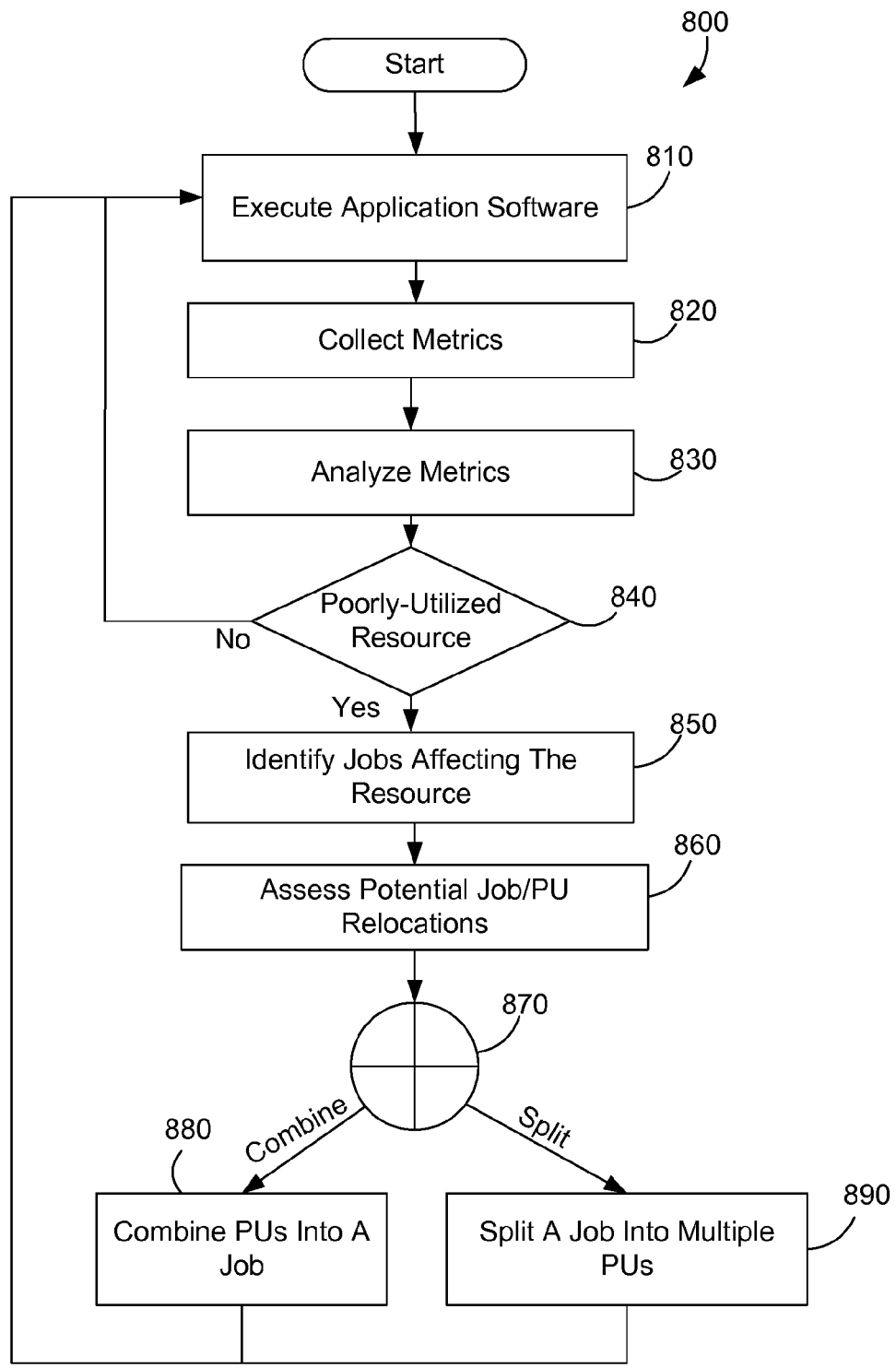
FIG. 8 is a method flow diagram for dynamically adjusting an application or job as described and claimed herein.

FIG. 8 shows a method 800 for dynamically adjusting allocation of processing units on a multi-nodal computer system according to embodiments herein. The steps in method 800 are preferably performed by the collector and job optimizer executing on the service node and/or the compute nodes of the system. First the job optimizer starts execution of the application with one or more jobs having on one or more compute nodes of the system, where each job may comprise one or more processing units (step 810). The collector then collects appropriate metrics that may include metrics for the system, node, application, a job or a processing unit (step 820). The job optimizer then analyzes the collected metrics (step 830). Next, the job optimizer checks for a poorly-utilized resource (step 840). If there is no poorly-utilized resource (step 840=no) the return to step 810. If there is a poorly-utilized resource (step 840=yes) then identify the jobs affecting the resource (step 850) and access the potential job and processing unit reallocations that could be used to alleviate the poorly-utilized resource (step 860). Determine whether to combine processing units or split processing units to alleviate the poorly-utilized resource (step 870). If it is determined to combine the jobs (step 870=combine) then combine one or more processing units into a single job (step 880) and return to step 810. If it is determined to split the jobs (step 870=split) then split a job into multiple processing units on separate nodes to alleviate the overutilization (step 890) and return to step 810. The method is then complete.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As described above, embodiments provide a method and apparatus for parallel debugging using rsync-based data protocol for a massively parallel computer system. Embodiments herein greatly decrease the amount of data that must be transmitted and stored for debugging and increased efficiency of the computer system to solve the prior art problem of network bandwidth and CPU time needed to determine the state of the system for debugging. This system leverages off of the prior art that used checksum algorithms like rsync to copy a computer file from one machine to another. One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

The invention claimed is:

1. A computer implemented method for dynamically changing the allocation of processing units on a multi-nodal computer system comprising the steps of:
   executing an application having a plurality of jobs, each with at least one processing unit on a plurality of nodes, where each node has at least one central processing unit (CPU) and a memory;
   collecting metrics associated with the multi-nodal computer system, the application, the jobs, the plurality of nodes and the processing units;
   analyzing the metrics;
   where there is an over utilized resource perform the steps of:
   identifying jobs affecting the over utilized resource;

assessing potential job and processing unit permutations;
dynamically changing the allocation of the processing units on the plurality of compute nodes based on the collected metrics by combining at least two processing units into a job on a single node, and further dynamically changing the allocation of the processing units by splitting a job into multiple jobs on a plurality of nodes, wherein interprocess communication between processing units of the job is within a node before splitting the job, after splitting the job the interprocess communication is handled by the multi-nodal computer system in a way that is invisible to the processing unit over a communication link between the different nodes;
wherein the metrics associated with the processing units are selected from: CPU utilization by the processing unit, memory utilization by the processing unit, data throughput of the processing unit, and data latency for the processing unit;
wherein the metrics associated with the application are selected from: aggregate CPU utilization by the application, aggregate memory utilization by the application, a result throughput for the application, and a result latency for the application;
wherein the metrics associated with the node are selected from: CPU utilization for the node and memory utilization for the node; and
wherein the metrics associated with the computer system are selected from: aggregate CPU utilization across the multi-nodal system, aggregate memory utilization across the multi-nodal system, aggregate network load across the multi-nodal system, and node-to-node network utilization.

* * * * *